US005677588A

United States Patent [19]

Strobl

[11] Patent Number: 5,677,588

[45] **Date of Patent: *Oct. 14, 1997**

[54] PLANAR CARBON SEGMENT COMMUTATOR

[75] Inventor: Georg Strobl, Stuttgart, Germany

[73] Assignee: Johnson Electric S.A., Switzerland

[ * ] Notice: The term of this patent shall not extend beyond the expiration date of Pat. No. 5,386,167.

[21] Appl. No.: 387,118

[22] Filed: Feb. 13, 1995

[30] Foreign Application Priority Data

Feb. 12, 1994 [GB] United Kingdom .................... 9402746

[51] Int. Cl.$^6$ ..................................................... H02K 13/00

[52] U.S. Cl. ........................... 310/237; 310/233; 310/235

[58] Field of Search ..................................... 310/233–235, 310/44, 42, 237

[56] References Cited

U.S. PATENT DOCUMENTS

| | | | |
|---|---|---|---|
| 5,157,299 | 10/1992 | Gerlach | 310/237 |
| 5,245,240 | 9/1993 | Takasaki | 310/237 |
| 5,255,426 | 10/1993 | Farago et al. | 29/597 |
| 5,386,167 | 1/1995 | Strobl | 310/237 |

FOREIGN PATENT DOCUMENTS

| | | | |
|---|---|---|---|
| 529911 | 8/1992 | European Pat. Off. . | |
| 0583892 | 7/1994 | European Pat. Off. | H01R 39/06 |
| 89070453 | 6/1989 | Germany . | |
| 4026951 | 2/1992 | Germany . . | |
| 2247994 | 9/1991 | United Kingdom . | |

*Primary Examiner*—Steven L. Stephan
*Assistant Examiner*—Michael Wallace, Jr.
*Attorney, Agent, or Firm*—Ostrolenk, Faber, Gerb & Soffen, LLP

[57] ABSTRACT

Carbon segments (7) of a planar commutator are moulded over contact members (5). Anchor means (8), integral with each carbon segment (7) have an interlocking part (11) engaging the rear surface (6) of the contact member (5) and fit into a first envelope (4) in the form of a recess of uniform transverse cross-section extending. rearwardly of the front end (3) of a moulded plastic base member (1). The contact members (5) are each attached to the base member (1) by means of locking portions (15) which project into second envelopes (14) having internal surfaces which grip the locking portions (15).

11 Claims, 4 Drawing Sheets

PLANAR CARBON SEGMENT COMMUTATOR

FIELD OF THE INVENTION

The invention relates to a planar or face plate commutator for use with contact brushes which bear axially against planar contact surfaces of the commutator, instead of bearing radially as in the case of a cylindrical commutator, and in which the contact surfaces are provided by a plurality of segments (normally arranged in an annular ring) having carbon outer layers for engagement with the contact brushes.

BACKGROUND ART

One known planar carbon commutator, disclosed in the specification of German Utility Model G 8907045.3, in the joint names of Deutsche Carbone A.G. and Robert Bosch GmbH, comprises an insulating base member having a rotational axis, a front end extending, at least in part, transversely to the rotational axis, and a plurality of first envelopes extending rearwardly from the front end; a plurality of circumferentially spaced contact members attached to the base member and having respective rear surfaces engaging the front end of the base member; and a plurality of circumferentially spaced overmoulded carbon segment respectively formed on the contact members and each having integral anchor means which extend rearwardly into said first envelopes.

Although the anchor means provided some radial support against centrifugal force for the carbon segments mounted on the contact members and some support against axial withdrawal from the contact member, this support is dependent on the shear strength of the carbon in the anchor means and on the frictional engagement between the anchor means and the first envelopes in which they extend. Therefore, to ensure adequate radial and axial support for the contact members and the carbon segments, the contact members have to be provided with rearward extensions, which are insert moulded into the front end of the base member, and undercut recesses for receiving integral rear portions of the overmoulded carbon segments. This involves relatively complex and time-consuming forming and pro-assembly operations. Moreover, the resultant products are not particularly robust.

DISCLOSURE OF THE INVENTION

The purpose of the present invention is to provide a planar carbon segment commutator which, at least to some extend, avoids the disadvantages of known planar carbon segment commutators and to provide a planar carbon segment commutator in which the carbon segments are more simply and more firmly secured to the base member.

In accordance with Applicant's invention, a planar carbon commutator segment for an electric motor comprises a base member having a rotational axis, a front end extending, at least in part, transversely to the rotational axis, a plurality of blind recesses extending rearwardly from the front end, a plurality of first regions in overlapping alignment with respective blind recesses, and a plurality of radially extending second regions projecting forwardly of the first regions and being respectively disposed between all pairs of adjacent first regions; a plurality of circumferentially spaced contact members attached to the base member adjacent the first regions and having rear surfaces engaging the front and of the base member so that the contact members of each adjacent pair are circumferentially separated by the radially extending, forwardly projecting second regions; and a plurality of circumferentially spaced overmolded carbon segments formed on respective contact members, each overmolded carbon segment having an integral anchor which extends rearwardly into a respective one of the blind recesses and which engages the rear surfaces of a respective contact member to be thereby attached to the contact member and resist axial withdrawal of the anchor from the blind recesses.

Thus, according to the invention, there is provided a planar carbon segment commutator, for an electric motor, comprising a base member having a rotational axis, a front end extending, at least in part, transversely to the rotational axis, a plurality of first envelopes extending rearwardly from the front end, a plurality of first regions, each of which is in overlapping alignment with at least one first envelope, and a plurality of radially extending second regions projecting forwardly of the first regions and respectively disposed between all pairs of adjacent first regions; a plurality of circumferentially spaced contact members attached to the base member, respectively mounted adjacent the first regions so that the contact members of each adjacent pair are circumferentially separated by the radially extending, forwardly projecting second regions, and having respective rear surfaces; and a plurality of circumferentially spaced overmoulded carbon segments respectively formed on the contact members and having integral anchor means which extend rearwardly into said first envelopes and have interlocking parts which engage the rear surfaces of the contact members to thereby resist axial withdrawal of the anchor means from the first envelopes.

The invention also provides a method of manufacturing a planar carbon segment commutator, for an electric motor, comprising the steps of providing a base member having a rotational axis, a front end extending, at least in part, transversely to the rotational axis, and a plurality of first envelopes extending rearwardly from the front end; and providing a plurality of carbon segments by moulding carbon over a plurality of circumferentially spaced contact members so that the contact members are attached to the base member with rear surfaces of the contact members adjacent the front end of the base member and anchor means integral with the carbon segments extending rearwardly into the first envelopes; wherein the front end of the base member is formed with a plurality of first regions, each of which is in overlapping alignment with at least one first envelope, and a plurality of radially extending second regions projecting forwardly of the first regions and respectively disposed between all pairs of adjacent first regions; the contact members are respectively disposed adjacent the first regions so that the contact members of each adjacent pair are circumferentially separated by the radially extending, forwardly projecting second regions; and the integral anchor means of the overmoulded carbon segments are provided with interlocking parts which engage the rear surfaces of the contact members to thereby resist axial withdrawal of the anchor means from the first envelopes.

The contact members are preferably overmoulded with a single layer of carbon by injection moulding a mixture of carbon powder and carrier material, such as phenolic resin, but the choice of carrier material and any subsequent heat treatment will depend on the operating requirements of different commutators, in accordance with known technology which forms no part of the present invention. The single layer of carbon formed in this way may then be divided into individual segments by cutting radial grooves which preferably extend into the base member.

Each contact member is preferably formed with at least one through hole, the carbon segment formed on each contact member has a first part, extending through each hole, and the interlocking parts of the carbon segments which engage the rear surfaces of the contact members are integral with the first parts extending through the holes and the contact members. This facilitates the overmoulding process.

In preferred embodiments of the invention, the base member has a plurality of second envelopes extending rearwardly from the front end, the contact members are each provided with at least one rearwardly extending locking portion, and the locking portions project into an interlock with the second envelopes to thereby attach the contact members to the base member.

The base member may be made of insulating material, such as moulded plastic, or of conductive material, such as aluminum, provided with insulating outer surfaces, e.g., of aluminum oxide.

According to a preferred embodiment of the invention, the base member is a pre-moulded plastic member, the first and second envelopes comprise axially extending blind holes, and each locking portion is formed with barbs which engage the internal surface of the blind hole in which the locking portion is disposed, to resist withdrawal of the locking portion from the blind hole.

Although the first envelopes are preferably blind holes or recesses of uniform transverse cross-section, for ease of manufacture of the preformed base and carbon moulds, as the anchor means of the carbon segments are retained in the first envelopes by the contact members and not by direct connection between the anchor means and the base member, the envelopes may be of any suitable form to accommodate the anchor means.

In an alternative preferred embodiment the base member is an overmoulded plastic member in which the first envelopes embrace the anchor means of the carbon segments and, where the contact members are provided with rearwardly extending locking portions, the second envelopes embrace these locking portions to thereby grip these locking portions so as to attach the contact members to the base member. As an additional or alternative method of locking the carbon segments and the contact members to the base member, the base member may be formed with retaining portions disposed forwardly of the contact members.

In manufacturing commutators according to the invention, the contact members are preferably formed as integral parts of a sheet of metal and interconnecting parts are removed from the sheet to separate the contact members after the contact members have been overmoulded with carbon.

Where the base member is pre-moulded from plastic material, the contact members may be attached to the base member before the carbon segments are moulded over the contact members. Alternatively, the contact members may be overmoulded with carbon before the contact members are attached to the base member. In this case, where the contact members are of copper, the copper contact members and the overmoulded carbon may be heat treated together before the contact members are attached to the base member.

Although the contact members bearing carbon segments may be attached to a preformed base member, preferably of moulded plastic material, the assembled contact members and carbon segments are preferably overmoulded with plastic material forming the base member. This plastic material embraces the interlocking parts of the anchor means integral with the overmoulding carbon segments, and the locking portions of the contact members to provide first and second envelopes.

Planar carbon segment commutators according to the invention are hereinafter described, by way of example only, with reference to the accompanying drawings.

DETAILED DESCRIPTION OF THE PREFERRED EMBODIMENTS

Figure 2:
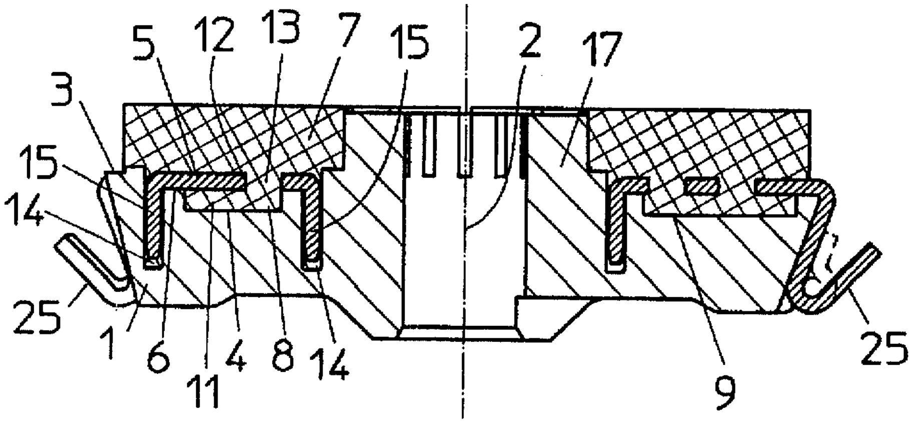
FIG. 2 is a sectional side elevation of the commutator shown in FIG. 1, after completion, sectioned along Line II—II of FIG. 1.
Figure 1:
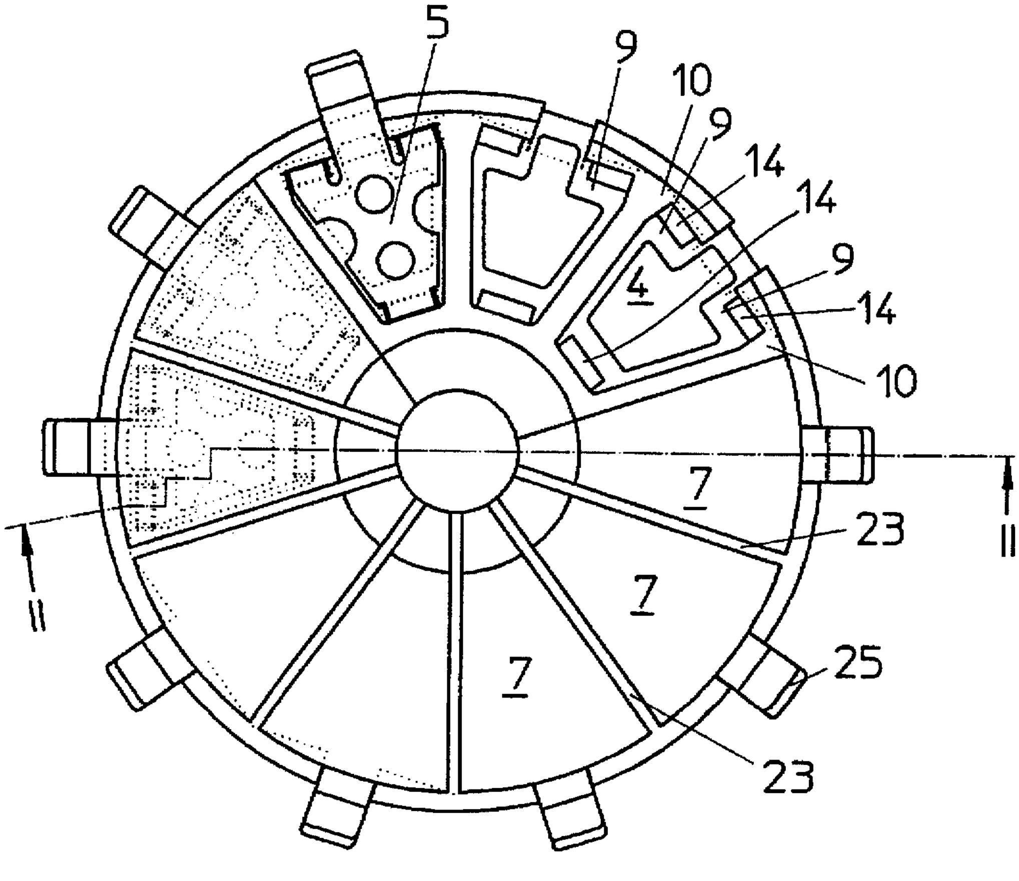
FIG. 1 is a schematic plan view of a first embodiment of the invention showing a planar carbon segment commutator with different parts at different stages of production.

The planar carbon segment commutator shown in FIGS. 1 and 2 has a rotational axis 2 and a pre-moulded plastic base member 1 having a front end 3 extending transversely of the rotational axis 2. The front end 3 of the base member 1 is formed with ten circumferentially spaced first envelopes 4, in the form of shallow blind holes, with ten first regions 9 respectively aligned with and overlapping the first envelopes 4, and with a plurality of radially extending second regions 10 which project forwardly of the first regions 9 so as to be disposed between adjacent pairs of the first regions 9. The front end 3 of the base member 1 is also formed with three second envelopes 14, also in the form of blind holes, surrounding each first envelope 4.

Figure 3:
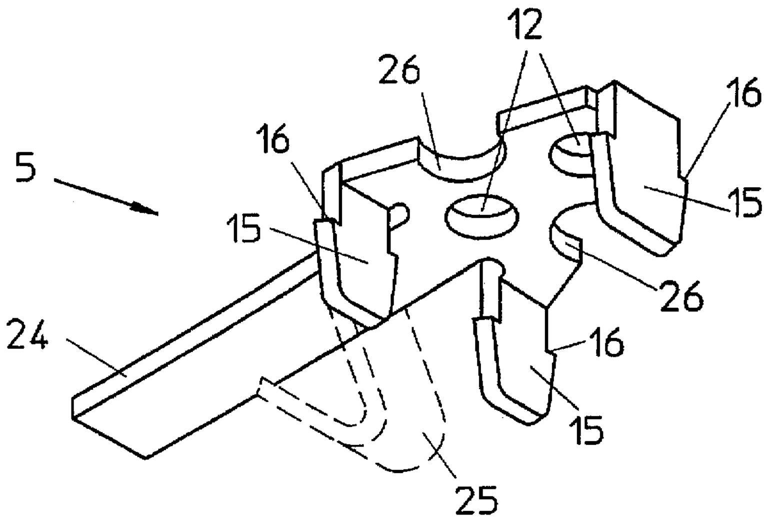
FIG. 3 is a perspective view of a contact member forming part of the commutator shown in FIGS. 1 and 2.

Ten contact members 5, as shown in FIG. 3, are formed from stamped copper sheet and have three locking portions 15 bent rearwardly for insertion in the second envelopes 14 to position the contact members 5 forwardly of the first envelopes 4. The contact members 5 are therefore mounted adjacent the first regions 9 and are circumferentially separated by the radially extending, forwardly projecting second regions 10. Barbs 16 on each locking portion 15 engage the internal surface of the blind hole forming the second envelope 14 in which the locking portion 15 is disposed, to resist withdrawal of the locking portion 15 from this blind hole. Each contact member 5 is also formed with a contact tang 24 which is bent, as shown in FIG. 3, to form a hook 25, for connecting the armature winding to the commutator, after the contact member 5 has been attached to the base member 1, as shown at the right hand side of FIG. 1.

As shown in FIG. 3, each contact member 5 is provided with two through holes 12 and with two side notches 36 which are aligned with the first envelopes 4 when the contact members 5 are attached to the base member 1.

The base member 1 and the contact members 5 fitted to the base member 1 are then placed in a suitable mould (not shown) defining an annular cavity surrounding a central ring portion 17 of the base member 1. A mouldable mixture of carbon powder and carrier material, such as phenolic resin, is then injected into the annular mould cavity. This injected material flows through the holes 12 and the side notches 26 formed in the contact members 5 and fills the first envelopes 4 to form an annular overmoulded ring.

The annular overmoulded ring is subsequently separated into ten carbon segments 7 respectively formed on the ten contact members 5 by cutting radial grooves 23 which extend right through the carbon to the radially extending, forwardly projecting second regions 10 of the front end 3 of the base member 1.

As shown in FIG. 2, the carbon segment 7 formed on each contact member 5 has integral anchor means 8 with a first part 13 extending through each hole 12 and each notch as well as an interlocking part 11 engaging the rear surface 6 of the contact member 5 to thereby resist withdrawal of the anchor means 8 from the first envelope 4 with which the contact member 5 is aligned.

Figure 5:
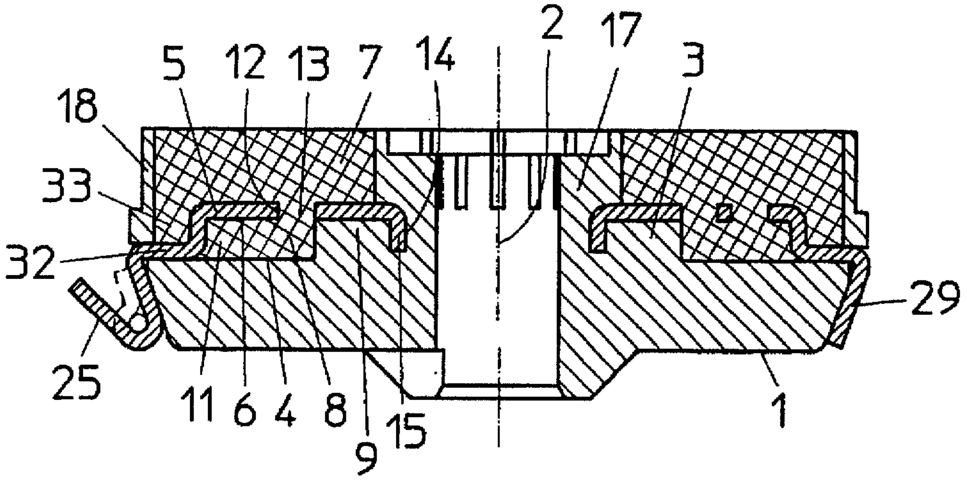
FIG. 5 is a sectional side elevation of the commutator shown in FIG. 5, after completion, sectioned along Line V—V of FIG. 4.
Figure 4:
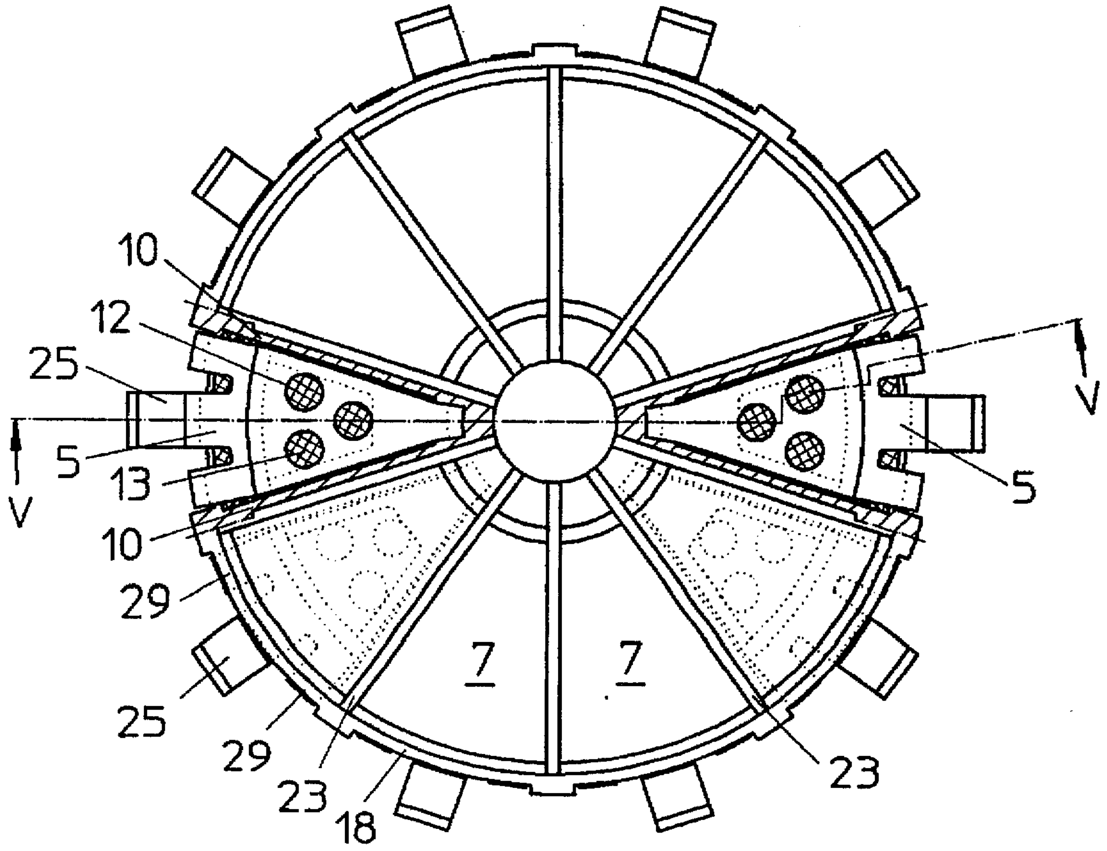
FIG. 4 is a schematic plan view of a second embodiment of the invention showing a planar carbon segment commutator with different parts at different stages of production.

The planar carbon segment commutator shown in FIGS. 4 and 5 differs from that shown in FIGS. 1 and 2 in that the contact members 5 are attached first to the carbon forming the segments 7, instead of the base member 1. The base member 1 is formed later, in an overmoulding operation in which it is attached to the contact members 5 to thereby hold the carbon forming the segments 7.

Figure 6:
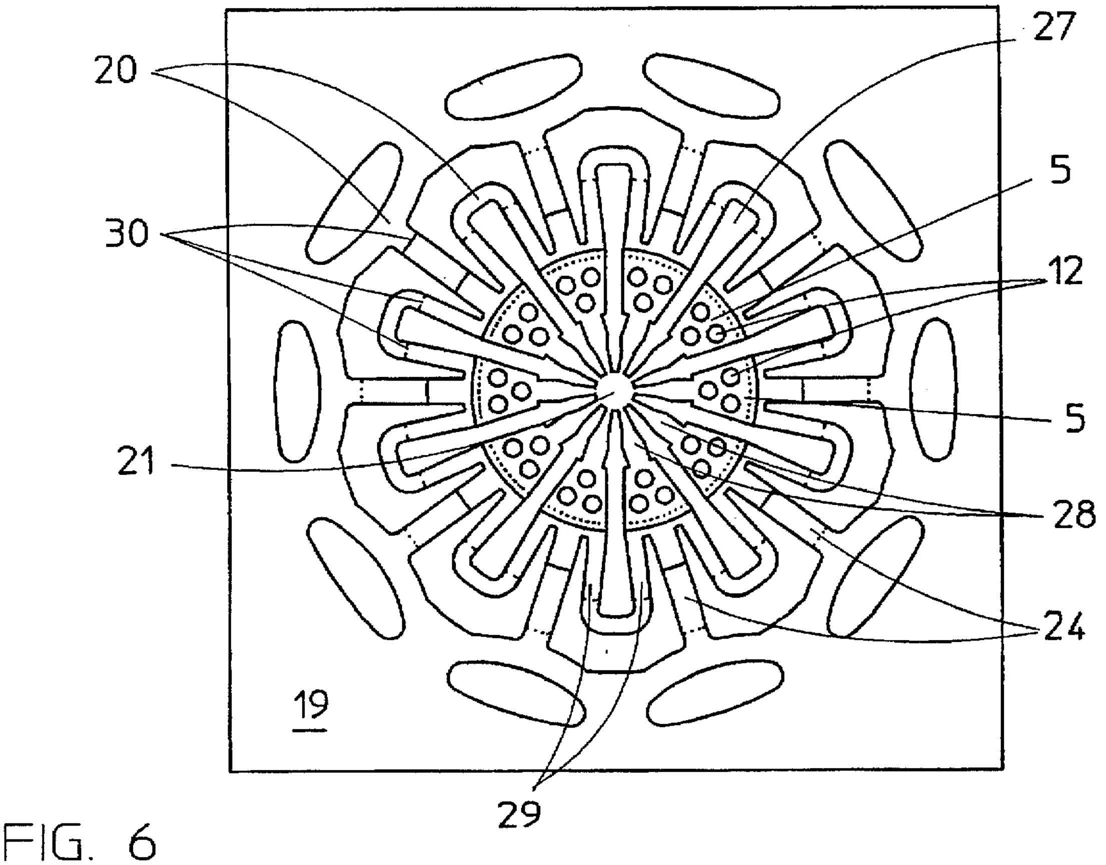
FIG. 6 is a plan view of a stamped copper sheet in which all the contact members of the commutator are integrally interconnected.

To form the commutator shown in FIGS. 4 and 5, a copper sheet 19 is stamped, as shown in FIG. 6 to form ten contact members 5 which are circumferentially separated by radially extending slots 27 and interconnected, around the periphery of the sheet 19, by outer connecting portions 20 and, at the centre of the sheet, by a circular inner connecting portion 21.

As shown in FIG. 6, each contact member 5 is formed with three through holes 12, a stem 28 connected to the central connection portion 21, a central contact tang 24 and two side tangs 29.

Figure 8:
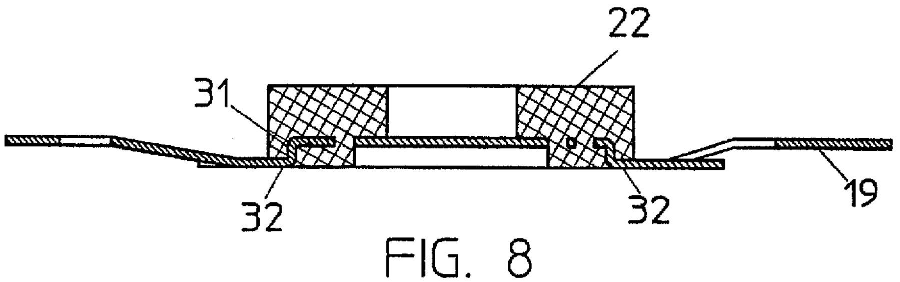
FIG. 8 is a sectional side elevation of the sub-assembly shown in FIG. 7, sectioned along Line VIII—VIII of FIG. 7.
Figure 7:
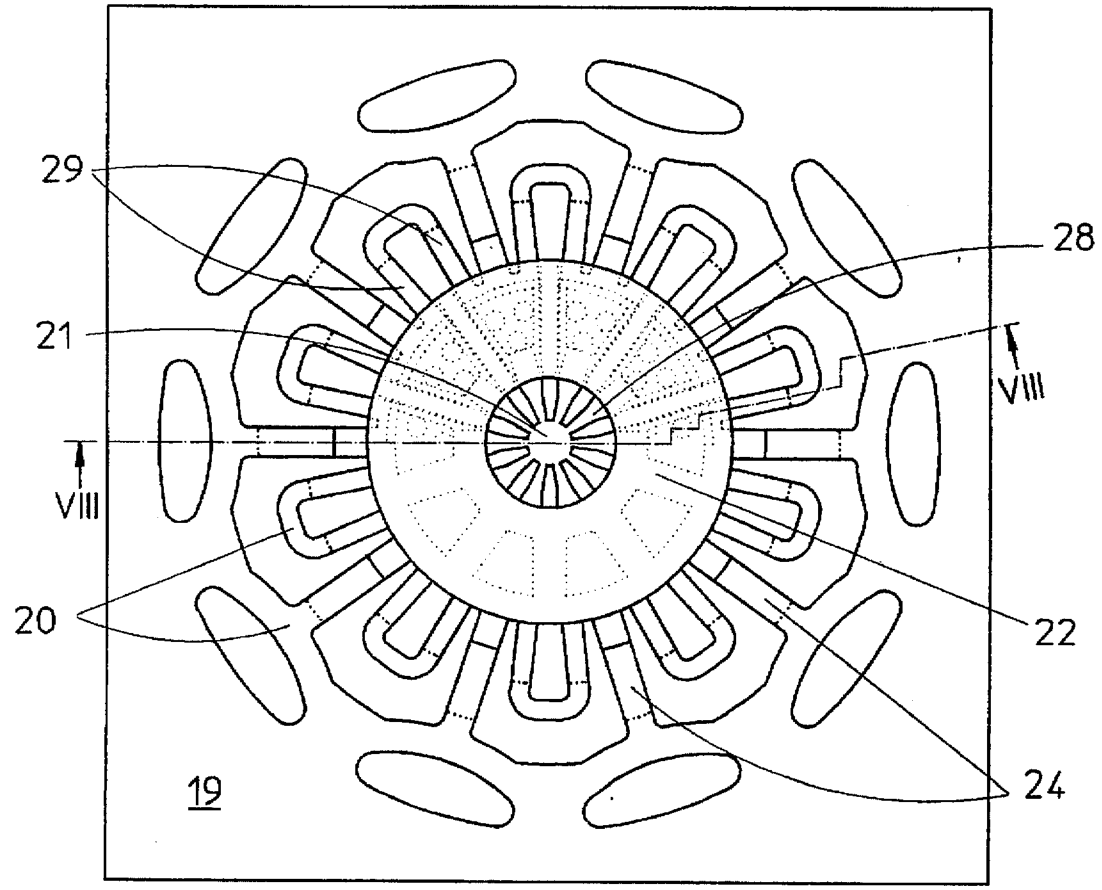
FIG. 7 is a plan view of the stamped copper sheet shown in FIG. 6 together with an annular overmoulded ring of carbon.

The stamped sheet 19 is then placed in a mould defining an annular cavity surrounding the central portion of the pressed sheet 19 and radial ribs which fill the slots 27 between adjacent contact members 5 to prevent these slots 27 from being filled with carbon. A mouldable mixture of carbon powder and carrier material is then injected into the mould cavity to form a sub-assembly comprising the stamped sheet 19 and an annular carbon ring 22, as shown in FIGS. 7 and 8, which may then be heat treated to remove the unwanted constituents of the carrier material mixed with the carbon powder, prior to injection moulding, and to relieve stresses in the copper sheet 19. The outer connecting portions 20 around the periphery of the sheet 19 are removed by cutting the sheet 19 at the parting lines 30. The inner connecting portion 21 is then removed, to separate the central stems 28 of the contact members 5 and these central stems 28 are bent rearwardly to form locking portions 15.

The contact tangs 24 are bent to form hooks 25 for armature windings, and the side tangs 29 are bent rearwardly, as shown in FIG. 5.

The sub-assembly is then placed in a further mould (not shown) defining a cavity surrounding the sub-assembly. Plastic material is then injected into the further mould to form an insulating base member 1, as shown in FIG. 5. The plastic material flows around the integral anchor means 8 of the carbon segments 7 formed on the contact members 5, to form first envelopes 4 which surround the anchor means 8, and around the locking means 15 which are thereby embraced by second envelopes 14 which grip the locking portions 15 and so resist withdrawal of the locking means 15 from the base member 1.

The plastic material also flows into the slots 27 left between the contact members 5 so as to divide the front end 3 of the base member 1 into first regions 9 in overlapping alignment with the first envelopes 4 and radially extending second regions 10 projecting forwardly of the first regions 9 so as to separate the contact members 5 of each adjacent pair. The radial grooves 23 which separate the annular carbon ring 22 into segments 7 extend through the carbon forming the segments 7 at least as far as the radially extending, forwardly projecting second regions 10 formed in the front end 3 of the base member 1.

The overmoulded base member 1 is also provided with retaining portions, in the form of a central ring portion 17 and an outer ring portion 18 disposed forwardly of the contact members 5 so as to overlap the contact members 5 and thereby hold the contact members 5 in a fixed relationship to the base member 1. These retaining portions 17 and 18 are subsequently divided into parts by the radial grooves 23.

Although the copper sheet 19 forming the contact members 5 may be planar, the sheet 19 may be formed with a forwardly dished portion 31 as shown, for example, in FIG. 8. The contact members 5 are therefore formed with rearwardly offset outer portions 32. This permits the formation of a more bulky and therefore more robust outer retaining ring portion 18. As a result, the first envelopes 4 not only surround the anchor means 8 formed integral with the carbon segments 7, but also surround parts 33 of the segments 7 disposed forwardly of the contact members 5. In this case, the radial grooves 23 separating the segments 7 must also be extended to separate the forwardly disposed parts 33 of the segments 7.

I claim:

1. A planar carbon segment commutator for an electric motor, the commutator comprising:

a base member having a rotational axis, a front end extending, at least in part, transversely to the rotational axis, a plurality of blind recesses extending rearwardly from the front end, a plurality of first regions in overlapping alignment with respective blind recesses, and a plurality of radially extending second regions projecting forwardly of the first regions and being respectively disposed between all pairs of adjacent first regions;

a plurality of circumferentially spaced contact members attached to the base member adjacent the first regions and having rear surfaces engaging the front and of the base member so that the contact members of each adjacent pair are circumferentially separated by the radially extending, forwardly projecting second regions; and a plurality of circumferentially spaced overmolded carbon segments formed on respective contact members, each overmolded carbon segment having an integral anchor which extends rearwardly into a respective one of the blind recesses and which engages the rear surfaces of a respective contact member to be thereby attached to the contact member and resist axial withdrawal of the anchor from the blind recesses.

2. A commutator, according to claim 1, in which:

each contact member is formed with at least one through hole;

the integral anchor means of the carbon segment formed on each contact member has a first part, extending through each hole; and the interlocking parts engaging the rear surfaces of the contact members are integral with the first parts extending through the holes in the contact members.

3. A commutator, according to claim 1, in which:

the base member has a plurality of second envelopes extending rearwardly from the front end;

the contact members are each provided with at least one rearwardly extending locking portion; and the locking portions project into and interlock with the second envelopes to thereby attach the contact members to the base member.

4. A commutator, according to claim 3, in which:

the base member is a pre-moulded plastic member and the first and second envelopes comprise axially extending blind holes; and each locking portion is formed with barbs which engage the internal surface of the blind hole in which the locking portion is disposed, to resist withdrawal of the locking portion.

5. A commutator according to claim 3, in which the base member is an overmolded plastic member in which the first and second blind holes respectively embrace the anchors of the carbon segments and the locking portions of the contact members.

6. A commutator, according to claim 1, in which the base member is formed with retaining portions disposed forwardly of the contact members.

7. A commutator, according to claim 1, in which the base member is an overmoulded plastic member in which the first envelopes embrace the anchor means of the carbon segments.

8. A commutator, according to claim 7, in which the base member is formed with retaining portions disposed forwardly of the contact members.

9. A planar carbon segment commutator for an electric motor, the commutator comprising:

a plurality of circumferentially spaced contact members having a front surface and a rear surface, each contact member having at least one locking portion;

a plurality of circumferentially spaced overmolded carbon segments formed on respective contact members and having integral anchor means which extend rearwardly and engage the rear surfaces of the contact members to be thereby attached to the contact members; and a plastic base member molded to both the contact members and segments and engaging the locking portions of the contact members, the base member having a rotational axis, a front end extending at least in part transversely to the rotational axis, the front end having a plurality of first regions surrounding the anchor means and engaging the rear surfaces of the contact members and having a plurality of second regions alternating with the first regions and extending radially and projecting forwardly of the first regions to separate the contact members.

10. A commutator according to claim 9, wherein:

each contact member is formed with at least one through hole; and the integral anchor means of the carbon segments extends through said at least one through hole.

11. A commutator according to claim 9, wherein the base member has retaining portions disposed forwardly of the contact members.

* * * * *